(12) United States Patent
Arnaud et al.

(10) Patent No.: US 8,880,332 B2
(45) Date of Patent: Nov. 4, 2014

(54) PEOPLE GUIDANCE USING KIOSK AND USER ID

(75) Inventors: Charles Arnaud, Villeneuve Loubet (FR); Philippe Gregoire, La Gaude (FR); Dominique Picard, Saint Jeannet (FR); Alexandre Van Gent, La Gaude (FR)

(73) Assignee: Toshiba Global Commerce Solutions Holdings Corporation (JP)

( * ) Notice: Subject to any disclaimer, the term of this patent is extended or adjusted under 35 U.S.C. 154(b) by 576 days.

(21) Appl. No.: 12/236,642

(22) Filed: Sep. 24, 2008

(65) Prior Publication Data

US 2010/0063724 A1 Mar. 11, 2010

(30) Foreign Application Priority Data

Sep. 10, 2008 (EP) .................................... 08305540

(51) Int. Cl.
*G01C 21/00* (2006.01)
*G01C 21/34* (2006.01)

(52) U.S. Cl.
CPC ..................................... *G01C 21/34* (2013.01)
USPC ........... 701/408; 701/533; 701/431; 701/434; 701/468; 340/944; 340/995.19; 340/572.1; 340/995.16; 340/995.23; 342/357.48; 342/357.31

(58) Field of Classification Search
CPC ........ G01C 21/20; G01C 21/00; G01C 21/26; G01C 21/3635; G01C 21/367; G01C 21/3476; G01C 21/3647; G01C 21/3682; G01C 21/206; G01C 21/265; G01C 21/32; G01C 21/34; G01C 21/3484; G01C 21/36

USPC ................ 701/202, 206; 705/5, 14.64, 14.73, 705/27.1, 1.1

See application file for complete search history.

(56) References Cited

U.S. PATENT DOCUMENTS

| 6,320,496 | B1 * | 11/2001 | Sokoler et al. | 340/407.1 |
|---|---|---|---|---|
| 6,349,261 | B1 | 2/2002 | Ohnishi et al. | |
| 6,418,372 | B1 * | 7/2002 | Hofmann | 701/526 |
| 6,442,449 | B1 * | 8/2002 | Blasy et al. | 700/235 |
| 6,587,835 | B1 * | 7/2003 | Treyz et al. | 705/14.64 |
| 7,205,889 | B2 * | 4/2007 | Howe et al. | 340/539.13 |
| 7,243,024 | B2 * | 7/2007 | Endicott | 701/440 |
| 7,271,739 | B2 * | 9/2007 | Higelin | 340/944 |
| 7,496,445 | B2 * | 2/2009 | Mohsini et al. | 701/434 |
| 7,518,533 | B2 * | 4/2009 | Mafune | 340/995.23 |

(Continued)

FOREIGN PATENT DOCUMENTS

WO 0142739 A1 6/2001

OTHER PUBLICATIONS

JP2006164073. "Customer Guidance System". Publication Date Jun. 22, 2006. Abstract Only.

(Continued)

*Primary Examiner* — Redhwan K Mawari
(74) *Attorney, Agent, or Firm* — Cantor Colburn LLP

(57) ABSTRACT

A method for providing navigation information to a user, the method including: inputting identification associated with the user into one terminal of a plurality of terminals distributed throughout an area visited by the user, each terminal being located in a kiosk and operating in kiosk mode; inputting a destination; computing a route from the kiosk to the destination; and presenting the route as the navigation information to the user.

20 Claims, 2 Drawing Sheets

(56) References Cited

U.S. PATENT DOCUMENTS

| | | | |
|---|---|---|---|
| 7,630,830 B2* | 12/2009 | Watanabe | 701/420 |
| 7,827,341 B2* | 11/2010 | Riddiford et al. | 710/303 |
| 7,925,429 B2* | 4/2011 | Geelen | 701/455 |
| 2002/0038181 A1* | 3/2002 | Okude et al. | 701/208 |
| 2003/0055689 A1* | 3/2003 | Block et al. | 705/5 |
| 2003/0093217 A1* | 5/2003 | Petzold et al. | 701/201 |
| 2004/0073439 A1* | 4/2004 | Shuster | 705/1 |
| 2005/0055155 A1* | 3/2005 | Mafune | 701/202 |
| 2005/0250458 A1* | 11/2005 | Graham et al. | 455/121 |
| 2007/0027628 A1* | 2/2007 | Geelen | 701/213 |
| 2007/0198182 A1* | 8/2007 | Singh | 701/211 |
| 2008/0228386 A1* | 9/2008 | Geelen et al. | 701/201 |
| 2008/0262717 A1* | 10/2008 | Ettinger | 701/206 |
| 2010/0063724 A1* | 3/2010 | Arnaud et al. | 701/202 |

OTHER PUBLICATIONS

JP2004078830. "Guidance System". Publication Date Mar. 11, 2004. Abstract Only.

Route Planner, [online]; [retrieved on Sep. 24, 2008]; retrieved form the Internet http://www.transvision.co.uk/Default.aspx?ID=222.

Fleet Planner, , [online]; [retrieved on Jun. 5, 2008]; retrieved form the Internet http://www.transvision.co.uk/Default.aspx?ID=15.

* cited by examiner

PEOPLE GUIDANCE USING KIOSK AND USER ID

This application claims priority to European Patent Application No. 08305540.0, filed 10 Sep. 2008, and all the benefits accruing therefrom under 35 U.S.C. §119, the contents of which in its entirety are herein incorporated by reference.

BACKGROUND

1. Field of the Invention

The present invention relates to presenting navigation information.

2. Description of the Related Art

A person visiting a new location may have many opportunities to get lost or to be unable to determine a route to a destination. For example, a person at an unfamiliar airport may have difficulty finding a check-in counter or gateway for a particular airline. As another example, a person visiting a large city can be confused as to his or her present position and where to go to reach a destination.

Several solutions have been developed to guide people. One solution is the typical "map-on-the-wall." Many maps are available but maps can have some drawbacks such as when a visitor has no idea of where the destination is located on the map. Consequently, the visitor will spend a lot of time trying to find the destination on the map and determine a route to the destination. Generally, information displayed on the map is static and general purpose oriented.

Another solution is to have a staff member provide guidance. The staff member may be dedicated to providing information such as in an information booth or may be non-dedicated such as an employee passing by who can be asked a question. Non-dedicated employees may not be available or may not have information that the visitor is trying to find.

Obtaining guidance from people can have challenges. For one, the route may not be optimized. For another, the visitor may have to memorize the route. If the user gets lost, then the user must repeat the process of getting new navigation information from a map or staff person. In addition, external events such as labor strikes, accidents and maintenance diversions may not be taken into account in determining an optimized route.

Yet another solution is for the visitor to use a Global Positioning System (GPS) device. Drawbacks to GPS devices include that GPS is generally applicable to positioning outdoors and GPS devices are expensive.

Therefore, what are needed are techniques for providing navigation information to a visitor. Preferably, the techniques require little input by the visitor and do not require a device giving the navigation information be carried by the visitor.

BRIEF SUMMARY

The shortcomings of the prior art are overcome and additional advantages are provided through the provision of a method for providing navigation information to a user, the method including: inputting identification associated with the user into one terminal of a plurality of terminals distributed throughout an area visited by the user, each terminal being located in a kiosk and operating in kiosk mode; inputting a destination; computing a route from the kiosk to the destination; and presenting the route as the navigation information to the user.

System and computer program products corresponding to the above-summarized methods are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Disclosed are techniques for providing navigation information to a person at a location. The person is generally a visitor not familiar with the location. The techniques, which include a system and method, call for a terminal at a kiosk to receive identification information (ID) and a destination from the person. The techniques then provide the person (or user) with the navigation information. The person following the navigation information can follow an optimized route to reach the destination. If, along the route, the person gets lost or disoriented, then the person can use the identification information at another kiosk to get updated navigation information from that kiosk to the destination.

Figure 1:
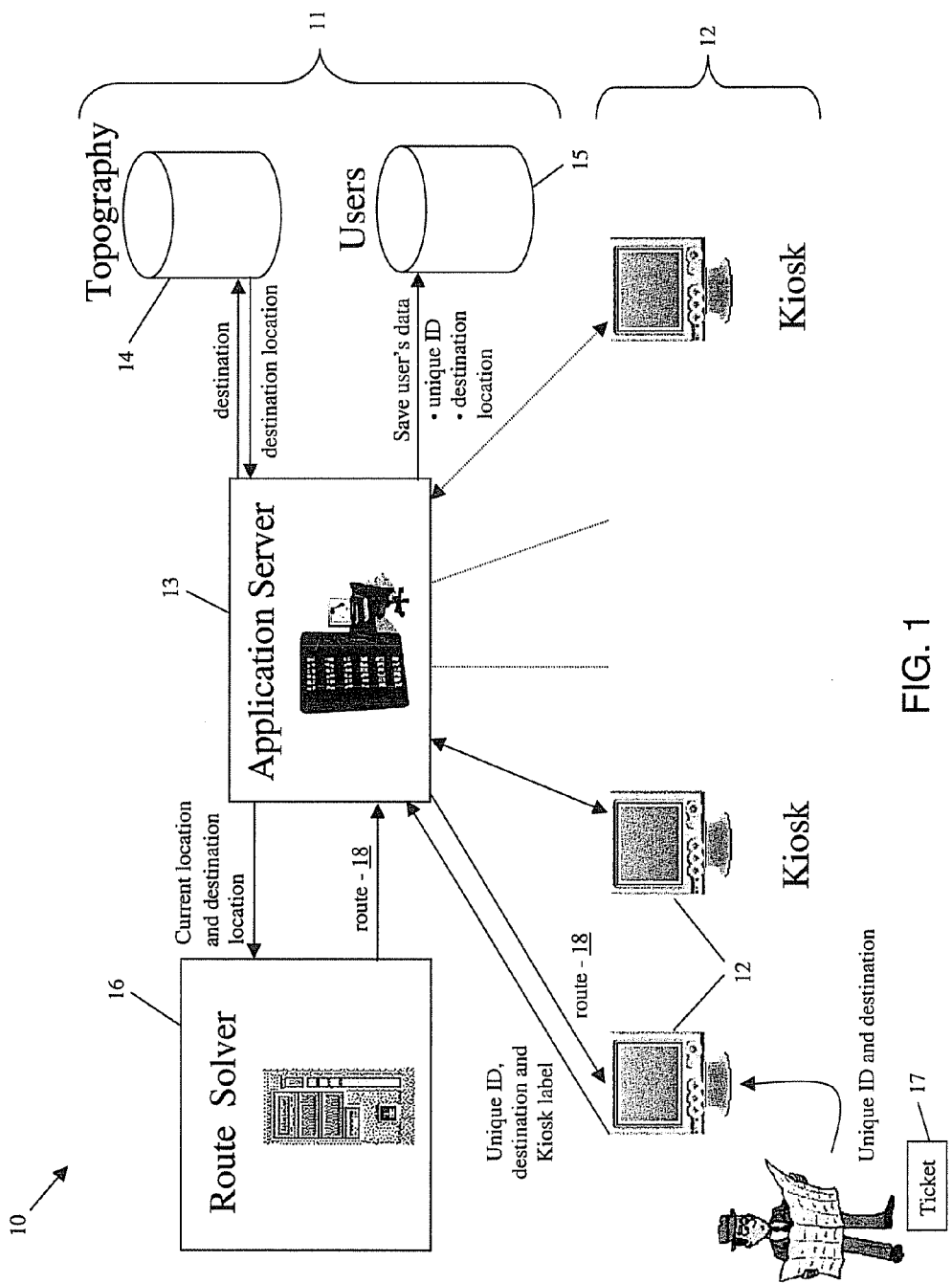
FIG. 1 illustrates an exemplary embodiment of a navigation system for providing navigation information to a user.

FIG. 1 illustrates an exemplary embodiment of a navigation system 10 for providing navigation information to a user. The navigation system 10 includes a computer processing system 11 coupled to a plurality of computer terminals 12. Each terminal 12 may be placed at a kiosk or built into a structure such as a wall. One requirement is that generally each terminal 12 can be accessible to members of the public or a designated group of users. In the embodiment of FIG. 1, the computer processing system 11 includes an application server 13, a topography application 14, a user information application 15, and a route solver application 16. In one embodiment, the route solver application 16 may include its own processing system.

Referring to FIG. 1, each terminal 12 interfaces with the computer processing system 11 via the application server 13. The terminals 12 operate in "kiosk mode" and are adapted to receive identification information 17 and a destination from the user. In addition, the terminals 12 are adapted to provide navigation information 18 to the user. Pre-issued forms of identification information 17 such as a ticket for a plane, train, or bus can be input to the terminals 12. In one embodiment, the terminal 12 can also provide the identification information 17 to the user. A non-limiting example of media containing the identification information 17 includes a ticket with computer-readable information such as at least one of a magnetic strip, bar code, punch code, shot code and computer-readable writing. Alternatively, in lieu of the media containing the identification information 17, the terminals 12 can be adapted to receive anthropometric data from the user. Non-limiting examples of the anthropometric data include a fingerprint, retina scan, and a voiceprint.

Each terminal 12 can include an input device such as a keyboard (including a touch-screen keyboard), mouse, optical scanner, optical reader, or anthropometric characteristic reader (such as a fingerprint reader, a retinal scanner, or a microphone) and an output device such as a display, a speaker, a printer, or a data terminal to transmit data. The keyboard can be used to input identification such as a name or character code.

The navigation information 18 includes an optimized route 18 to the destination as referred to in FIG. 1. Non-limiting examples of the media containing the navigation information 18 include a printed map with the optimized route 18, a map with the optimized route 18 displayed on a display such as a flat screen display, audio directions of the optimized route 18, and a down-load of the optimized route 18 to a personal digital device such as a portable hard-drive music player. The optimized route 18 can be highlighted on the map and/or include turn-by-turn directions. Turn-by-turn directions are generally used with audio directions.

Because a user may become lost or disoriented along the optimized route 18, the terminals 12 are adapted to read issued identification and provide an updated or refreshed optimized route 18 from the current location of the user to the destination. Refreshment is fast because all data related to the user and the destination is already entered into the navigation system 10.

The user information application 15 is used to store and access information unique to each user such as the identification of the user and the destination of the user. The user information application 15 is accessed through the application server 13.

The topography application 14 is used to store and access topography information applicable to the surrounding area of the user. The topography information includes a geographic location of the destination, all kiosk locations, and current location of the user (generally obtained from the kiosk location of the user). In addition, the topography information includes travel problems that can pose a challenge to the user. Non-limiting examples of the travel problems include inaccessible routes caused by maintenance, accidents, or labor strikes, routes overcrowded with other traffic, and unsafe routes. The topography application 14 can be regularly updated to include current information regarding any travel problems. Updating can occur on a periodic schedule or when a travel problem develops. The topography application 14 is accessed through the application server 13.

The route solver application 16 determines a route from the user's current location to the user's destination. The route is optimized with regard to at least one of several optimization criteria taking into account the applicable travel problems. Examples of the optimization criteria include a shortest travel time, a shortest distance, a shortest walking distance, an easiest walking route, a shortest bicycling distance, an easiest bicycling route, and scenery along route. The route solver application 16 receives the user's current location, the user's destination and the travel problems as input from the topography application 14 via the application server 13. As output, the route solver application 16 provides the optimized route 18 to the terminal 12 at the user's current location via the application server 13.

For convenience, certain definitions are presented. The term "kiosk" relates to any structure, whether freestanding or attached to another structure, that includes the terminal 12. The term "kiosk mode" relates to a computer terminal that employs custom software that allows interaction with a user while preventing the user from accessing system functions. The term "destination" relates to a name of a place or geographic location to which the user desires to go. The geographic location may be described with geographic coordinates. The topography application 14 can be used to associate the name of a place with a geographic location. The term "identification" relates to information identifying a user of the navigation system 10. The identification information can be contained in some media such as a ticket or it can be an anthropometric characteristic of the user. The identification can be unique to the user or to a group of users such as all passengers on the same flight.

Figure 2:
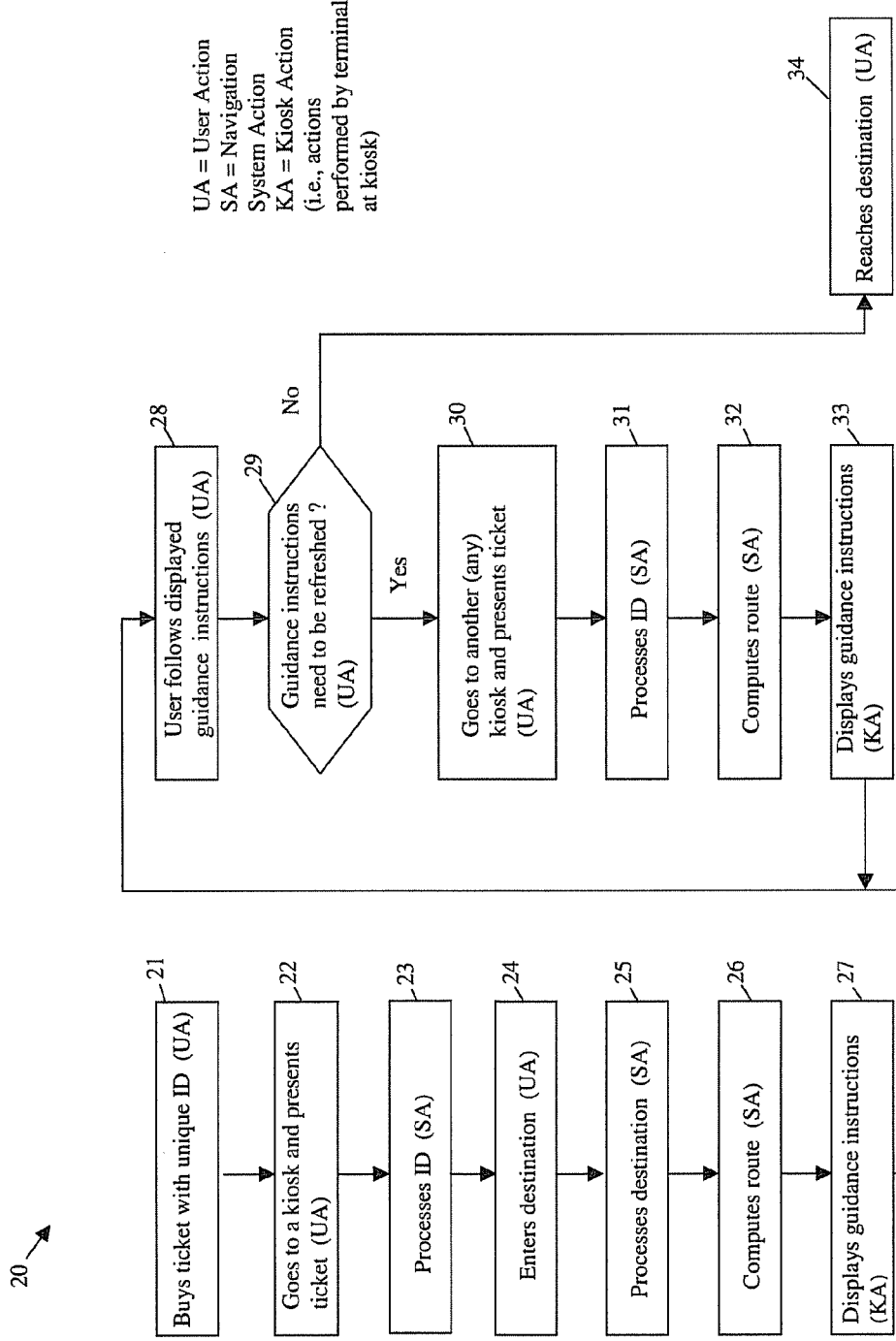
FIG. 2 presents one example of a method for providing the navigation information to the user.

FIG. 2 presents one example of a method 20 for providing navigation information to a user. The method 20 includes (step 21) the user buying a ticket having the identification information 17. In step 22, the user goes to a kiosk and presents the ticket to a terminal 12. In step 23, the computer processing system 11 processes the identification information 17. Step 23 includes storing the identification information 17 in the users application 15. In step 24, the user enters a destination into the terminal 12. In step 25, the computer processing system 11 processes the destination. Step 25 includes storing the destination in the users application 15 and using the topography application 14 to determine the geographic location of the destination. In step 26, the route solver application 16 computes an optimized route from the location of the user at the kiosk to the destination. In step 27, the terminal 12 displays the navigation information 18 (i.e., the optimized computed route 18) to the user. In step 28, the user follows the navigation information 18.

In step 29, the user determines if the navigation information 18 needs to be refreshed. If the user determines that the information 18 does not need to be refreshed, then the user proceeds to the destination as step 34. If the user determines that the information 18 needs to be refreshed, then the user goes to another kiosk and presents the ticket to the terminal 12 at that kiosk as step 30. In step 31, the computer processing system 11 processes the identification information 17 associated with the ticket. In step 32, the route solver 16 computes a refreshed optimized route 18 from the location of the user at the another kiosk to the destination. In step 33, the terminal 12 at the another kiosk displays the refreshed optimized route 18 to the user. The user then follows the refreshed optimized route 18 in step 28.

One benefit of the navigations system 10 is that the user does not need to use a tracking device such as a GPS tracking device. With a tracking device, someone unknown to the user may be able to track the continuous movements of the user. However, use of the navigation system 10 is voluntary and on a need basis.

The computer processing system 11 includes a processor, memory, storage, communications bus, input/output interfaces, input devices such as a keyboard and mouse, output devices such as a printer and display, and operating system instructions. As these devices and instructions are well known in the art, they are not discussed in any detail herein.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing navigation information to a user, the method comprising:
    presenting a ticket with unique identification identifying a specific user to one terminal of a plurality of terminals distributed throughout an area visited by the user, each terminal being located in a kiosk and operating in kiosk mode;
    storing the unique identification in a user information application that is accessed through an application server;
    inputting a name of a destination at the terminal presented with the ticket;
    storing the destination in the user information application;
    inputting a travel problem into a topography application, the topography application having geographic locations of all kiosks in the area and an elevation of each of the kiosks, the topography application being configured to associate the name of a place with a geographic location;
    computing in a navigation system with a computer processing system a route according to an optimization criterion for scenery that will be viewed by the user along the route from the terminal presented with the ticket to the destination, wherein the route takes into account the travel problem input into the topography application and the topography application provides information for computing the route optimized for scenery along the route; and
    presenting the route as the navigation information to the specific user.

2. The method of claim 1, further comprising:
    presenting the ticket to another terminal at another kiosk;
    computing with the computer processing system another route according to the optimization criterion for scenery that will be viewed by the user along the route from the another kiosk to the destination; and
    presenting the another route to the user.

3. The method of claim 1, wherein the destination is input automatically upon presentation of the ticket.

4. The method of claim 1, wherein the destination is input manually by the user.

5. The method of claim 1, wherein the travel problem comprises at least one of a maintenance detour, a stop or slowdown due to an accident, a stop or slowdown due to high traffic volume, and an unsafe area.

6. The method of claim 5, wherein computing comprises determining an optimized route that avoids the travel problem area.

7. The method of claim 1, wherein the route is further computed according to an optimization criterion for shortest travel time or bicycling distance.

8. The method of claim 1, wherein the ticket comprises at least one of a computer readable character code, shot code, and punch code.

9. The method of claim 1, further comprising inputting anthropometric data wherein the anthropometric data comprises at least one of a fingerprint, a retinal scan, and a voice print.

10. A method for providing navigation information to a user, the method comprising:
    presenting a ticket with unique identification identifying a specific user to one terminal of a plurality of terminals distributed throughout an area visited by the user, each terminal being located in a kiosk and operating in kiosk mode;
    storing the unique identification in a user information application that is accessed through an application server;
    inputting a name of a destination at the terminal presented with the ticket;
    storing the destination in the user information application;
    inputting a travel problem into a topography application, the topography application having geographic locations of all kiosks in the area and an elevation of each of the kiosks, the topography application being configured to associate the name of a place with a geographic location;
    computing in a navigation system with a computer processing system a route optimized for easiest travel from the terminal presented with the ticket to the destination, wherein the route takes into account the travel problem input into the topography application and the topography application provides information for computing the route optimized for easiest travel; and
    presenting the route as the navigation information to the specific user.

11. The method of claim 10, wherein the route is optimized for easiest walking.

12. The method of claim 10, wherein the route is optimized for easiest bicycling.

13. The method of claim 10, wherein presenting comprises downloading the route to a portable hard-drive music player and presenting the route as audio turn-by-turn directions.

14. A method for providing navigation information to a user, the method comprising:
    presenting a ticket with unique identification identifying a specific user to one terminal of a plurality of terminals distributed throughout an area visited by the user, each terminal being located in a kiosk and operating in kiosk mode;
    storing the unique identification in a user information application that is accessed through an application server;
    inputting a destination at the terminal presented with the ticket;
    storing the destination in the user information application;

inputting a travel problem into a topography application, the topography application having geographic locations of all kiosks in the area and an elevation of each of the kiosks, the topography application being configured to associate the name of a place with a geographic location;

updating the topography application with current information regarding the travel problem;

computing in a navigation system with a computer processing system a route according to an optimization criterion for scenery that will be viewed by the user along the route from the terminal presented with the ticket to the destination, wherein the route takes into account the travel problem input into the topography application and the computer processing system accesses the topography application by way of an application server to provide information for computing the route optimized for scenery along the route; and presenting the route as the navigation information to the specific user.

15. The method of claim 14, wherein presenting comprises downloading the route to a portable hard-drive music player and presenting the route as audio turn-by-turn directions.

16. The method of claim 1, wherein presenting comprises downloading the route to a portable hard-drive music player and presenting the route as audio turn-by-turn directions.

17. The method of claim 1, further comprising updating the topography application with current information regarding the travel problem.

18. The method of claim 17, wherein the updating occurs on a periodic schedule.

19. The method of claim 17, wherein the updating occurs when the travel problem develops.

20. The method of claim 10, further comprising updating the topography application with current information regarding the travel problem.

* * * * *